United States Patent [19]
Wightman et al.

[11] 3,876,861
[45] Apr. 8, 1975

[54] HEATING UNIT

[76] Inventors: John W. Wightman, 3303 S. Gordon Ct., St. Louis, Mo. 63114; Lawrance W. Wightman, 3 Ridgecreek, St. Louis, Mo. 63141

[22] Filed: Oct. 3, 1974

[21] Appl. No.: 511,708

[52] U.S. Cl. ............... 219/463; 219/430; 219/432; 219/433; 219/462; 219/464; 219/530; 338/22 SD
[51] Int. Cl. ............................................. H05b 3/68
[58] Field of Search ............ 219/430, 432, 433, 439, 219/441, 458, 459, 462, 463, 464, 530; 338/22 SD

[56] References Cited
UNITED STATES PATENTS

| | | | |
|---|---|---|---|
| 693,144 | 2/1902 | Monath............................ | 219/462 X |
| 1,478,919 | 12/1923 | Sacerdote et al............... | 219/462 X |
| 2,196,484 | 4/1940 | Wentworth...................... | 219/462 |
| 2,253,927 | 8/1941 | Butler et al..................... | 219/433 X |
| 2,448,388 | 8/1948 | Plumer............................ | 219/433 |
| 3,496,336 | 2/1970 | Hingorany et al.............. | 219/464 |
| 3,551,644 | 12/1970 | Sano et al....................... | 219/441 |
| 3,679,869 | 7/1972 | Keeler............................. | 219/432 |
| 3,733,462 | 5/1973 | Bouchard et al............... | 219/464 |
| 3,778,594 | 12/1973 | Wightman....................... | 219/430 |

*Primary Examiner*—Yolodymyr Y. Mayewsky
*Attorney, Agent, or Firm*—Polster and Polster

[57] ABSTRACT

A heating unit particularly adapted to maintain hot potable liquid at a desired temperature has an inverted heat conductive pan mounted in a base to be exposed through an area of and form a part of the upper portion of the base, a plate of positive temperature coefficient resistance material mounted within the confines of a rim of the pan, contact members each with a lead leg and contact foot, the contact feet of the members being spaced apart in immediate electrical contact with a broad surface of the plate. A stiffly flexible mounting bar of electrically insulative material, mounted on its ends on the rim of the pan, constitutes the means for holding the plate and contact members in position relative to one another.

8 Claims, 6 Drawing Figures

HEATING UNIT

BACKGROUND OF THE INVENTION

The heating element of this invention is particularly adapted to maintain hot potable liquid at a desired temperature for indefinite periods. The illustrative embodiment described is designed to serve as a substitute for the base of a combination such as is shown in U.S. Pat. No. 3,778,594. It is simpler and less expensive to manufacture than the base and heating element shown in that patent.

SUMMARY OF THE INVENTION

In accordance with this invention generally stated a heating unit is provided which includes a base of heat insulative material having vertically spaced upper and lower surfaces, an opening in its upper surface and an inverted heat conductive pan with a surface of a size and shape complementary to the opening and an annular rim depending from the surface, mounted in the opening, to be exposed through an area of and form a part of the upper portion of the base. A plate of positive coefficient resistance material is mounted within the confines of the rim of the pan in heat transfer relation to the pan surface. The plate is flat and broad relative to its thickness. One broad surface of the plate is adjacent the under surface of the pan but electrically insulated therefrom. Two contact members, each having a contact foot and a lead leg have their contact feet in immediate electrical contact with a broad surface of the plate at areas spaced laterally from one another. A stiffly flexible mounting bar of electrically insulative material is mounted at its ends on the rim of the pan, and serves as the means for holding the resistance plate and contact feet in assembled relation. The lead legs are connected to conductors of a power cord for connection to a source of electrical energy.

In the preferred embodiment, the pan is metal, a thin sheet of electrically insulative, heat conductive material is interposed between the pan and the plate, the contact feet are positioned flat on the opposite broad side of the plate from the pan, and the mounting bar is held in place by staking a part of the rim on diametrically opposite sides. The lead legs are connected to the conductors by a novel double crimp.

DESCRIPTION OF THE PREFERRED EMBODIMENT

Figure 1:
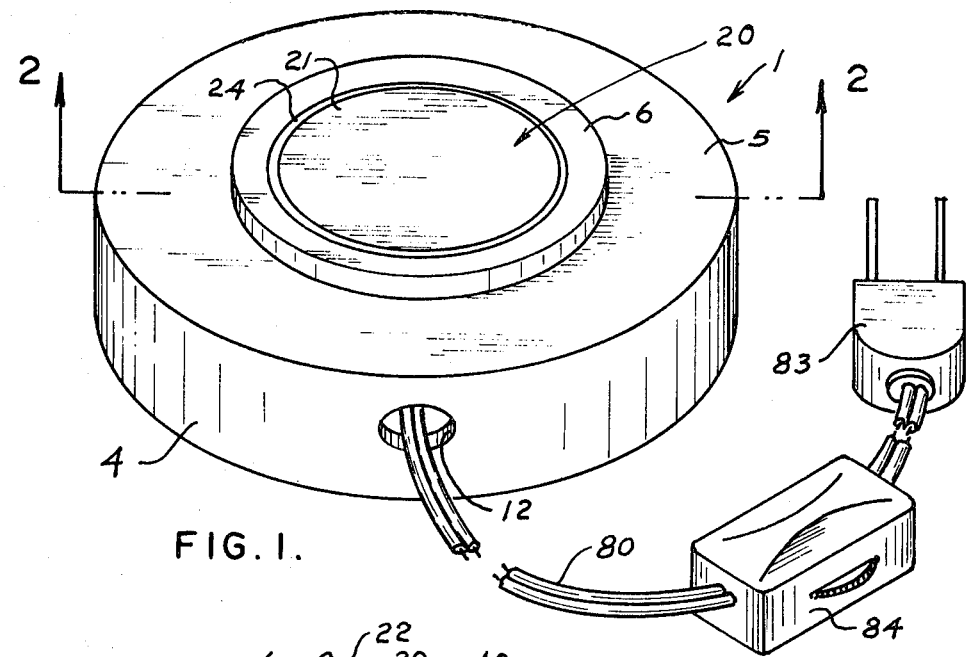
FIG. 1 is a view in perspective of one embodiment of heating unit of this invention.
Figure 2:
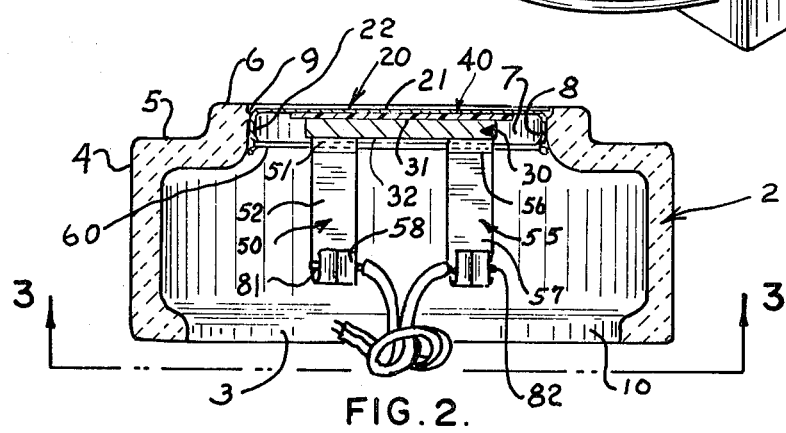
FIG. 2 is a sectional view taken along the line 2—2 of FIG. 1.
Figure 3:
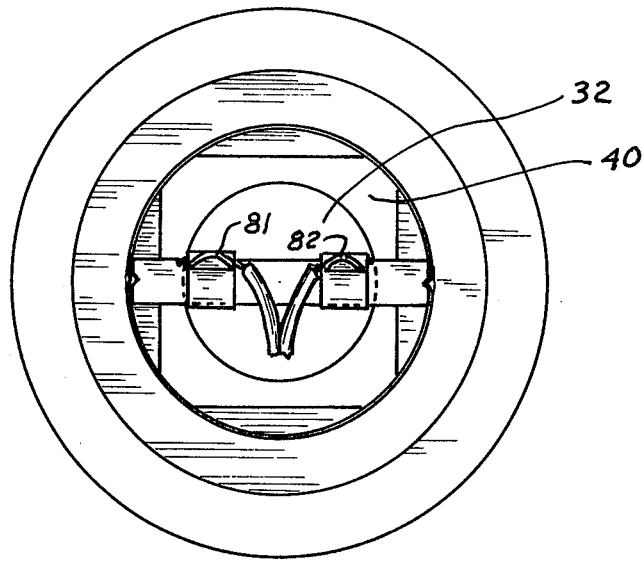
FIG. 3 is a bottom plan view in the direction indicated by 3—3 of FIG. 2.

Referring now to FIGS. 1–3 of the drawing for one illustrative embodiment of heating unit of this invention, reference numeral 1 indicates an assembled unit. The unit 1 includes a hollow base 2, with a bottom wall 3, side wall 4, and top wall 5. In this embodiment, the top wall includes an annular bead 6, defining a circular opening 7. The bead 6, in this embodiment, has an annular rabbet 9 in the inner wall 8 at the upper mouth of the opening 7.

An inverted pan 20, with a flat upper surface 21 and a depending rim 22 is mounted in the opening 7. The pan 20 is shaped complementarily to the shape of the opening 7, as defined by the wall 8, fits snugly within the opening and is secured by means of a suitable adhesive 24 such as a silastic or epoxy adhesive.

A thin, broad, disc-like plate 30 of positive temperature coefficient resistance (PTCR) material is mounted in heat transfer relationship to the under side of the pan 20. In the embodiment shown, a thin sheet 40 of electrically insulative, heat conductive material such as Nomex or Kapton (nylon and polyimid materials, both products of E. I. DuPont de Nemours Co.), is interposed between the pan and the plate 30. The sheet 40 may be adhered to the pan for convenience in assembly.

The plate 30 of PTCR material is flat and thin relative to the area of its top and bottom surfaces 31 and 32 respectively. The plate of this embodiment has printed contacts spaced apart on its outer side which extend around the edge of the plate on diametrically opposite sides and are electrically connected to printed spacedly interdigitated conductive paths.

Contact members 50 and 55, have contact feet 51 and 56 respectively and lead legs 52 and 57. The contact feet, in this embodiment, are formed tightly around a stiffly flexible mounting bar 60 of an electrically insulative material such as glass filled plastic capable of withstanding temperatures above 100°C without softening. The mounting bar 60 is elongatedly rectangular in shape, thin relative to its width, and is preferably initially bowed in a direction toward the plate 30 at its center. The ends of the mounting bar 60 are in close engagement with the inner wall of the rim 22 of the pan, and are held by a stacked edge of the rim in a substantially planer condition, the bias of the originally bowed bar exerting a continuous bias, forcing a flat surface of the contact feet into electrical contact with the spaced contacts on the broad lower surface 32 of the plate 30. The same bias keeps the plate 30 in tight engagement with the sheet 40 and the sheet in tight engagement with the under surface of the pan 20. The pre-mounting of the contact feet 51 and 56 on the mounting bar 60 insures that an exactly predetermined lateral spacing of the contact areas of the contact feet on the plate 30 is obtained and maintained.

The outer ends of the lead legs 52 and 57 are bent over to define tabs 58 which, with the legs, as described in more detail hereinafter, are crimped around electrical conductors 81 and 82 leading from an electric cord 80, adapted, by means of an electrical connector 83 by way of an on-off switch 84, to be connected to a suitable source of electric power. The electric cord 80 is shown as passing through a hole 12 in the side wall 4 of the base.

In this illustrative embodiment, a large opening 10 in the bottom wall 3 permits easy assembly of the unit.

In this embodiment, the base 2 is made of ceramic. However, it can be made of any heat and electrically insulative material, such as plastic or wood. The pan 20 in this embodiment is made of stainless steel which has the advantage of a low coefficient of expansion, but it can be made of aluminum or any other suitable heat conductive material. In this embodiment, the PTCR plate can be made of doped barium titanate, of a composition to provide a uniform heating temperature of approximately 100°C, the PTCR element being self regulating by nature. The contact members are made of aluminum or other suitable conductive metal, and must be capable of taking a set to permit the contact feet to be bent tightly around the mounting bar and the ends of the lead legs to be crimped tightly around the electrical conductors.

Figure 4:
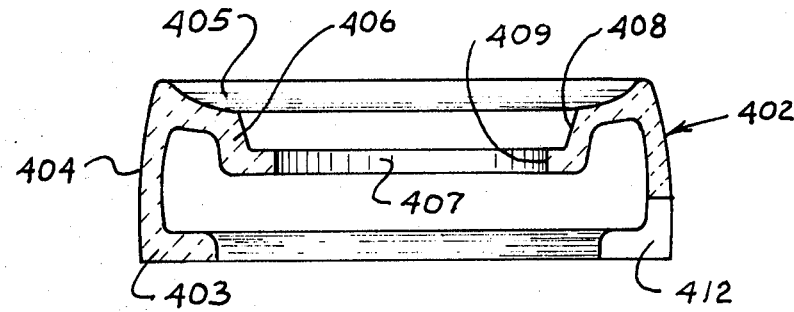
FIG. 4 is a transverse sectional view of another embodiment of base of the heating unit of this invention.

Referring now to FIG. 4, for another embodiment of base element of the heating unit of this invention, reference 402 indicates a hollow base, with a bottom wall 403, side wall 404 and top wall 405. In this embodiment, the top wall includes a stepped annular bead 406, with an upwardly outwardly diverging surface 408, and an annular shelf 409, an inner face of which defines a circular opening 407. A notch 412 opens through the side wall 404 and bottom wall 403, to provide entrance for an electric cord, not here shown. In this embodiment, an inverted pan 20, plate 30, sheet 40, contact members 50 and 55, and mounting bar 60, all identical with those shown in the embodiment of FIGS. 1 through 3 are utilized. However, the pan 20 is mounted with its rim 22 resting on the shelf 409 closely adjacent the wall 408. The space between the rim, which is perpendicular to the horizontal upper surface of the shelf 409 and the wall 408 which is upwardly outwardly divergent, is filled with adhesive. An advantage of this construction is that locating of the pan with respect to the upper surface of the base is determined automatically by the relative dimensions of the elements of the bead 406. In this embodiment, the pan extends to the upper level of the wall 408, and is framed by the sloping surface of the top wall 405, which serves as a locating member for a stepped cup, not here shown.

Figure 5:
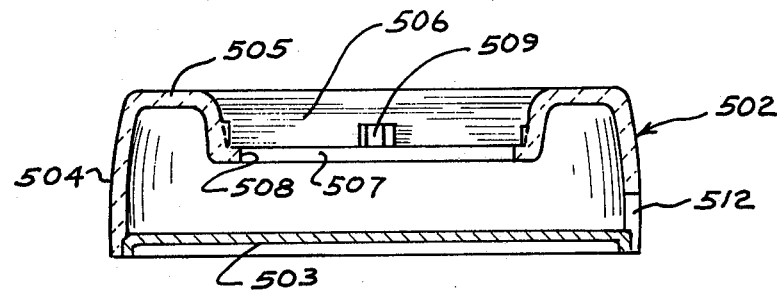
FIG. 5 is a transverse sectional view of still another embodiment of base of the heating unit of this invention.

In FIG. 5, a base 502 is illustrated, with a closed bottom wall 503, a side wall 504, a top wall 505, and a stepped bead 506. The stepped bead 506 has a shelf 508, projecting radially inwardly, an inner face of which defines a circular opening 507. The bead 506 has a radius between it and the top wall 505, but is otherwise substantially vertical, and the shelf 508 meets the inner wall of the bead 506 at substantially right angles, with a small fillet for manufacturing purposes. In this embodiment, spacing bosses 509 extend from the upper surface of the shelf 508, vertically along the inner face of the vertical wall of the bead 506 to a height approximately that of a pan 20. A pan 20, of a diameter substantially the same or slightly less than the diameter of a circle defined by the inner faces of the bosses 509, is mounted with its rim resting upon the upper surface of the shelf 508. Adhesive is introduced to the space between bosses 509, to hold the pan in place.

In the assembly of the heating unit of each of the embodiments of base shown, all of the elements which are attached to the inside of the pan 20, can be mounted initially to form a single assembly, and the entire assembly then mounted in the base. The plug and switch arrangement can even be mounted to the electric cord 80 before the device is fully assembled. Thus, referring to FIGS. 1 and 2, the free end of the knotted cord 80 can be passed through the base opening 12 from the outside to the inside of the base, and out through the opening 7, the conductors 81 and 82 separated and stripped of insulation, and knotted, in the conventional way, and the stripped ends connected to the lead legs 52 and 57.

Figure 6:
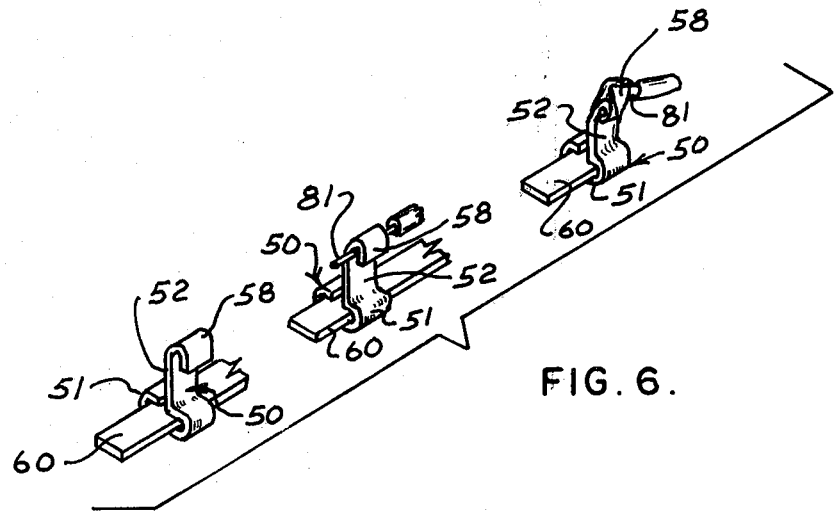
FIG. 6 is a view in perspective illustrating three steps in the securement of an electrical conductor to a lead leg of the heating unit of this invention.

It has been found that the contact members 50 and 55 can be made of aluminum, and given effective electrical connection with the conductors 81 and 82, which may be of copper, by performing the steps shown best in FIG. 6, where three stages in the connecting process as applied to the contact member 50 are shown. In the left-most illustration as viewed in FIG. 6, the contact 51 has been bent tightly around the mounting bar 60, and the tab 58 is bent parallel with the leg 52. As shown in the center of the three illustrations in FIG. 6, the bare conductor 81 is then inserted in the pocket between the tab and the leg. A crimping tool, not here shown, with an anvil jaw, with a V-shaped notch in it, and a forming jaw with a complementarily shaped wedge projecting from it, is placed with the notch on the far side as viewed in FIG. 6, and the wedge on the near side, and the jaws moved toward one another, crimping the tab, leg and conductor together, as shown in the right-most of the illustrations in FIG. 6. The effect of the kind of crimp produced by this process is to strip the oxide coating from the aluminum at the surface of the tab and the leg in immediate mechanical and electrical contact with the conductor, providing an excellent electrical contact and, at the same time, because of the nature of the crimp, providing an exceptionally secure mechanical connection.

Numerous variations in the construction of the heating unit of this invention, within the scope of the appended claims, will occur to those skilled in the art in light of the foregoing disclosure.

Merely by way of illustration and not limitation, the pan 20 can be made of an electrically non-conductive material, in which case the sheet 40 can be eliminated and the plate 30 placed in direct contact with the under surface of the pan. The bar 60 can be made rigid, and bias either be provided from some other source, such as an annular spring washer or the whole assembly be made rigid, although this is not as satisfactory a construction. If the plate 30 is made substantially coextensive with the under side of the pan 20, contact feet of contact members can be positioned between the plate and insulation contiguous the pan on diametrically opposite edges of the plate, held against outward movement by the rim of the pan. Broad top and bottom contact feet can also be used, the current passing through the thickness of the plate. A cup of the sort described in U.S. Pat. No. 3,778,594 can be used advantageously with the heating element of this invention, but other types of cups, including those with thin, non-metallic bottoms, even plastic cups dependent upon the conduction of the liquid in the cup to keep the plastic from melting, may be used with plates designed to keep the contents of the cup hot but not boiling, because there is no danger of run-away overheating of the plate and pan. These variations are merely illustrative.

Having thus described the invention, what is claimed and desired to be secured by Letters Patent is:

1. A heating unit particularly adapted to maintain hot potable liquid at a desired temperature for indefinite periods comprising a base of heat insulative material, said base having a cylindrical side wall and vertically spaced upper and lower walls and an opening in its said upper and lower walls; a heat conductive pan having a surface of a size and shape complementary to the upper surface of said opening and an annular rim depending from said surface; said pan being mounted in said upper opening to be exposed through an area of and form a part of the upper portion of said base, said rim extending inwardly of the base, an electric heating plate of positive temperature coefficient resistance material mounted within the confines of the rim of said pan in heat transfer and electrically insulated relation to said pan surface, said heating plate being flat and broad relative to its thickness, a broad surface of said plate being adjacent the under surface of the pan, two electrical contact members each having a contact foot and a lead leg, each of said contact feet being in immediate electrical contact with at least one broad surface of said plate at areas spaced laterally from one another; a stiffly flexible mounting bar of electrically insulative material mounted at its ends on said rim and, intermediate its ends, biasing said plate and contact feet into engagement, and electrical conductors attached to said lead legs and extending outside of said base through an opening therein for connecting said contact members with a source of power.

2. The heating unit of claim 1 wherein the mounting bar is initially bowed with its center toward the said plate.

3. The heating unit of claim 1 wherein the contact feet of said contact members are bent around the said mounting bar to pre-mount them in properly spaced position.

4. The heating unit of claim 2 wherein the mounting bar is mounted on said rim by a staked spur in said rim.

5. The heating unit of claim 1 wherein the contact feet are broad and lie on opposite broad sides of the plate.

6. The heating unit of claim 1 wherein the annular rim of the heat conductive pan is uninterrupted.

7. The heating unit of claim 7 including closure means for closing said lower opening.

8. The heating unit of claim 1 wherein the opening through which the electrical conductors extend is in the cylindrical wall of the base.

* * * * *

UNITED STATES PATENT OFFICE
CERTIFICATE OF CORRECTION

Patent No. 3,876,861      Dated April 8, 1975

Inventor(s) Wightman et al

It is certified that error appears in the above-identified patent and that said Letters Patent are hereby corrected as shown below:

Column 6, claim 7, line 1, "claim 7 wherein" should be ---claim 1 wherein---.

Signed and Sealed this twenty-ninth Day of July 1975

[SEAL]

Attest:

RUTH C. MASON
*Attesting Officer*

C. MARSHALL DANN
*Commissioner of Patents and Trademarks*